May 18, 1971  D. A. DAHLGREN  3,579,433
VERTICAL COLUMN ELECTROPHORESIS APPARATUS
Filed April 24, 1968
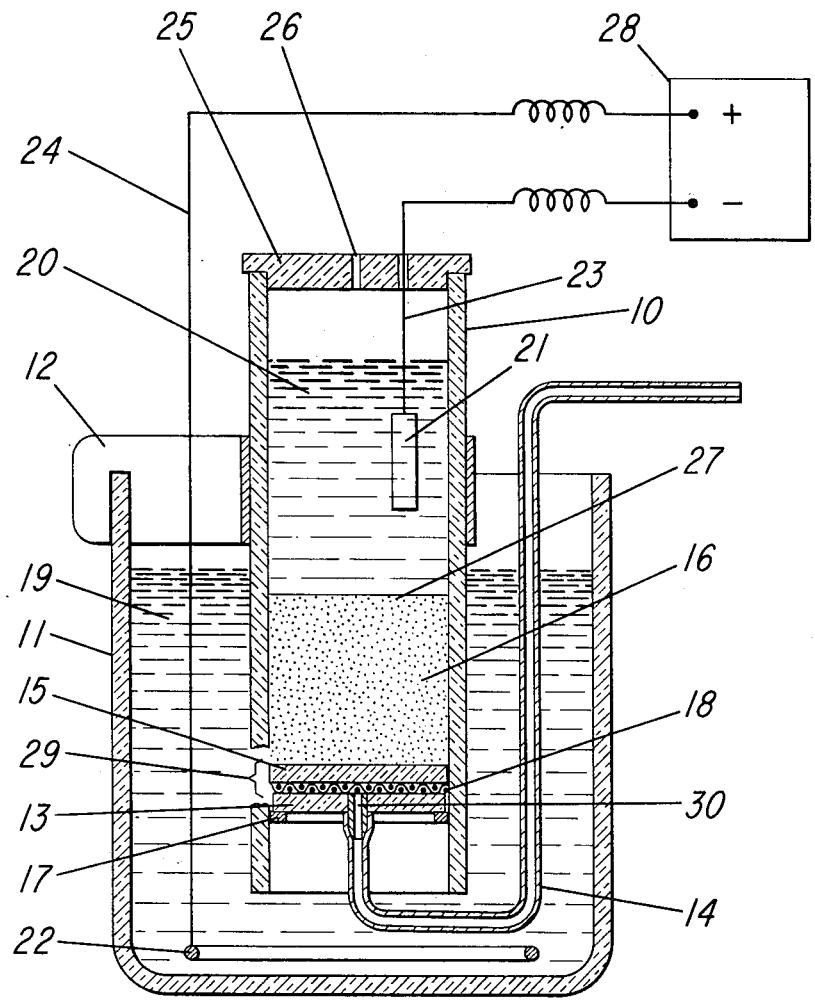
INVENTOR.
DONALD A. DAHLGREN
BY
ATTORNEY United States Patent Office 3,579,433
Patented May 18, 1971

3,579,433
VERTICAL COLUMN ELECTROPHORESIS APPARATUS
Donald A. Dahlgren, Portage, Mich., assignor to The Upjohn Company, Kalamazoo, Mich.
Filed Apr. 24, 1968, Ser. No. 723,658
Int. Cl. B01k 5/00
U.S. Cl. 204—299
6 Claims

ABSTRACT OF THE DISCLOSURE

An apparatus for gel electrophoresis of proteinaceous materials includes an electrophoretic gel column, means to establish a substantially uniform unidirectional potential longitudinally across the column, and a collection chamber below the column. A buffer solution enters the collection chamber and radially sweeps the proteinaceous material entering the chamber from the column toward a centrally situated exit means and downwardly therethrough.

BACKGROUND OF THE INVENTION

Gel electrophoresis involves the separation of complex mixtures of proteinaceous materials such as serum proteins, tissue extracts, hormones, enzymes, polypeptides, and the like, by means of differential migration of the mixture components through a gel medium in an electric field. While gel electrophoresis techniques are a well established analytical tool, the widespread acceptance of gel electrophoresis for preparative work in biology and related sciences has been hampered by the lack of suitable and relatively inexpensive apparatus for that purpose.

It is the principal object of the present invention to provide preparative gel electrophoresis apparatus having a relatively high capacity and capable of a high degree of component resolution.

It is another object of the present invention to provide an apparatus of a relatively inexpensive, yet durable, design which is easy to use and which can be readily disassembled for cleaning and/or storage.

A further object is to provide a preparative gel electrophoresis apparatus having a discontinuous buffer system and providing continuous component elution whereby the collection of component fractions during electrophoresis is greatly facilitated.

Still other objects will readily present themselves to the skilled artisan upon reference to the ensuing specification, the drawing, and the claims.

SUMMARY OF THE INVENTION

The foregoing objects are achieved by a gel electrophoresis apparatus which comprises a substantially vertical column of electrophoretic gel having a top portion and a bottom portion, means to establish a substantially uniform unidirectional potential longitudinally across the column, a collecting chamber situated below the gel column and communicating with the bottom portion thereof; and recovery means which is adapted to sweep a proteinaceous material entering the collection chamber from said column substantially radially toward a centrally situated exit means and downwardly therethrough.

BRIEF DESCRIPTION OF THE DRAWING

In the drawing the figure represents a cross-sectional elevation of the gel electrophoresis apparatus.

DESCRIPTION OF THE PREFERRED EMBODIMENTS

Referring to FIG. 1, a cylinder 10 open at both ends is vertically suspended in an open-mouth jar or beaker 11 by a support member 12 or similar means. The jar 11 is adapted to contain a first buffer solution 19, and the cylinder 10 is adapted to contain an electrophoretic gel 16 and a second buffer solution 20 thereabove. The gel 16 can be self-supporting or, in the alternative, can be semi-rigid and held in place by a partition 15 which must be ion-permeable and also permeable to the proteinaceous materials migrating through the gel. A suitable material of construction for this purpose is porous polyethylene having a pore size in the range from about 10 to about 50 microns. Preferably the pore size ranges from about 30 to about 40 microns.

An elution plate 13 which is an ion-permeable disc suitably made of porous polyethylene, or the like, is situated in a spaced relationship with and below the partition 15. The elution plate 13 and the partition 15 together define a collection chamber 29 below the gel column 16. Preferably the ion-permeability of the elution plate 13 is such that a substantially uniform potential can be maintained longitudinally across the column 16 as will be more fully discussed below.

The elution plate 13 is also provided with a central opening 30 which communicates with the collection chamber 29 and enables the proteinaceous material collecting in said chamber 29 to be continuously removed therefrom via a confined flow passageway or conduit 14. The elution plate 13 fits loosely against the adjacent wall of cylinder 10 so that the buffer solution 19 contained in jar 11 can pass freely therebetween and into the chamber 29.

When suction is applied to the fluid materials contained in chamber 29 via the conduit 14 by means of a pump or a suitable siphon arrangement, fresh buffer solution enters the chamber 29 around the periphery of the elution plate 13 and, by moving radially toward the central opening 30, sweeps the proteinaceous materials eluted from gel column 16 downwardly therethrough. The particular radial flow pattern of the buffer solution 19 into the chamber 29 can also be varied by providing suitably spaced minute holes in the elution plate 13 or by a suitable selection of plate porosity, if desired. The flow rate of buffer solution through the collection chamber 29 can be modulated by controlling the fluid withdrawal rate through conduit 14. The plate 13 can be held in place by a retaining ring 17 or any other convenient means. Optionally, a spacer means 18 between the plate 13 and the partitions 15 can be provided to assure a constant volume for the chamber 29. A nylon screen, or the like, can be used for this purpose. Also, in order to prevent the passing of some proteinaceous material through the elution plate 13, a dialysis membrane, or the like, can be interposed between the spacer means 18 and the plate 13, if necessary.

The driving force for the differential migration of the several components in a proteinaceous mixture is the electromotive force across the gel column. In order to assure a relatively sharp separation of the components, a substantially uniform unidirectional potential longitudinally across the gel column is desirable. To this end the apparatus of this invention contemplates an electrode 21 situated in electrical contact with buffer solution 20 and connected via lead 23 to one pole of a direct current power source 28, and another electrode 22 situated in electrical contact with buffer solution 19 and connected via lead 24 to the opposite pole of the direct current power source 28. The electrodes 21 and 22 can be made of carbon, a noble metal such as platinum, or the like.

Inasmuch as the buffer solutions 19 and 20 are conductive and aqueous in nature, during operation of the apparatus some electrolysis of the solutions may occur with attendant gas bubble generation. To this end it is preferred to situate the lower electrode 22 so that any gas bubbles generated thereat and released therefrom will not become trapped within the lower portion of cylinder 10, but will rise to the surface of buffer solution 19 and be dissipated in the ambient atmosphere.

The buffer solutions 19 and 20 also serve as heat sinks for the heat generated while the gel electrophoresis apparatus is in use. In the event these heat sinks prove to be inadequate during a particular application, suitable heat exchange means such as cooling coils, the so-called "cold fingers," a heat transfer jacket around cylinder 10, or jar 11, or the like can be utilized.

Also, a cover 25 equipped with a vent hole 26 for the top of cylinder 10 can be provided, if desired.

The present apparatus can be used with a wide variety of electrophoretic gels such as starch gels, silica gels, agar gels, and the like. The gels can be rigid or semi-rigid. Particularly suitable for use with the present apparatus is a semi-rigid, water-insoluble acrylamide polymer gel obtained by copolymerizing acrylamide with methylenebisacrylamide. This gel is practically transparent and can be formed with a minimum of about 2.5 percent of the monomer mixture, the maximum concentration of the polymer in the gel being limited only by the solubility of the acrylamide and methylenebisacrylamide. The crosslinking agent is methylenebisacrylamide and its concentration can be varied from a minimum of about 1 percent of the total monomer content to a maximum of its solubility limit in water. With an increasing polymer concentration, the gel becomes stronger and more rigid. A solid mixture of about 95 percent acrylamide and 5 percent methylenebisacrylamide is commercially available.

The apparatus is readied for use by casting a desired gel, such as the aforementioned acrylamide polymer gel, in the cylinder 10 substantially as shown in FIG. 1. The casting can be conveniently accomplished by first capping the lower end of cylinder 10, filling the cylinder with water to a level sufficiently high to cover the elution plate 13 when in place, and then placing the latter two elements in their normal positions. Any excess water above the partition 15 is decanted and the desired gel solution poured in place. The air volume above the poured gel solution is swept out by nitrogen and the solution is permitted to set. The time to set can be shortened if the gel solution is deoxygenated.

Once the gel has set, the lower portion of cylinder 10 is uncapped and the water drained therefrom, conduit 14 is connected to elution plate opening 30, and the cylinder 10 suspended in jar 11. Next the buffer solutions 19 and 20 are poured in place, the necessary electrical connections made, and the proteinaceous mixture to be separated is layered on top of the upper surface 27 of gel 16 by means of a pipette or the like. The direct current power source is then turned on and the current passing through the gel is regulated so as to permit the proteinaceous mixture to penetrate gel 16 without undue distortion. When the penetration has been effected, the current flow is increased to the normal operational level and the separation carried out. Sweeping of the collection chamber 29 is commenced just before the first separated component of the mixture passes through partition 15, and is continued until all of the desired components have been recovered.

I claim:

1. Apparatus for electrophoretic separation of proteinaceous materials comprising:
   a column of electrophoretic gel having a top portion and a bottom portion;
   means to establish a substantially uniform unidirectional potential longitudinally across the column;
   a collecting chamber situated below said column and communicating with the bottom portion thereof; and
   recovery means around the periphery of said collecting chamber adapted to sweep a proteinaceous material entering the collection chamber from said column substantially radially toward a centrally situated exit means and downwardly therethrough.

2. Apparatus in accordance with claim 1 wherein the column of electrophoretic gel is supported by a porous, protein-permeable partition.

3. Apparatus in accordance with claim 1 wherein the recovery means comprises an ion-permeable, porous disc juxtaposed below the column of electrophoretic gel and in a spaced relationship therefrom and provided with a central opening communicating with the collection chamber.

4. Apparatus in accordance with claim 1 wherein the means for establishing a uniform unidirectional potential longitudinally across the column comprises a pair of electrodes adapted to be bathed in separate buffer solutions which are in electrical contact with the top and the bottom of said column, respectively, and connected to a source of direct current.

5. Apparatus in accordance with claim 1 wherein the electrophoretic gel is an acrylamide polymer gel.

6. An apparatus for preparative gel electrophoresis which comprises:
   a jar provided with an open end and a bottom, and adapted to contain a buffer solution;
   a cylindrical container, open at both the upper and the lower end thereof, substantially vertically suspended in said jar and adapted to hold therein a column of an electrophoretic gel and a buffer solution thereabove;
   a protein-permeable partition adapted to support the electrophoretic gel, situated near the lower end of said column and extending thereacross in a direction substantially normal to the longitudinal axis thereof;
   an ion-permeable disc juxtaposed below said protein-permeable partition and in a spaced relationship therefrom, therewith defining a collecting chamber, said disc being provided with a central opening which communicates with the collecting chamber and being adapted to regulate the flow of the buffer in the collecting chamber;
   a conduit means communicating with the collecting chamber through the central opening in said disc;
   a first electrode situated within said open-ended jar near the bottom thereof and adapted to be connected to one pole of a direct current power source; and
   a second electrode situated within said cylindrical container near the upper end thereof and adapted to be connected to the other pole of a direct current power source.

References Cited
UNITED STATES PATENTS

| | | | |
|---|---|---|---|
| 2,989,457 | 6/1961 | Van Oss et al. | 204—299 |
| 3,290,240 | 12/1966 | Neren | 204—299 |
| 3,326,790 | 6/1967 | Bergrahm | 204—180 |
| 3,346,479 | 10/1967 | Natelson | 204—301 |
| 3,375,187 | 3/1968 | Buchler | 204—301 |
| 3,384,564 | 5/1968 | Ornstein et al. | 204—180 |

TA-HSUNG TUNG, Primary Examiner

A. C. PRESCOTT, Assistant Examiner

U.S. Cl. X.R.

204—180G